United States Patent [19]

Gold

[11] 4,004,895
[45] Jan. 25, 1977

[54] COAL REACTOR

[76] Inventor: Louis Gold, 2725 39th St., NW., Washington, D.C. 20007

[22] Filed: Apr. 29, 1975

[21] Appl. No.: 572,769

Related U.S. Application Data

[63] Continuation-in-part of Ser. No. 355,400, May 30, 1973, abandoned.

[52] U.S. Cl. .................................. 48/101; 48/210; 75/41
[51] Int. Cl.² ....................... C10J 3/00; C10J 3/08
[58] Field of Search ............ 48/210, 202, 204, 197; 75/41, 42; 48/101; 252/373

[56] References Cited

UNITED STATES PATENTS 2,593,257  4/1952  Bradley ............................. 48/210

*Primary Examiner*—R.E. Serwin
*Attorney, Agent, or Firm*—Sughrue, Rothwell, Mion, Zinn & Macpeak

[57] ABSTRACT

A vertical shaft furnace having a diameter substantially equal to the height thereof is employed for the clean combustion of coal to convert the coal virtually stoichiometrically to carbon monoxide. After providing a supporting bed of coke in the base of the furnace a mixture of coal and limestone is introduced through the top of the furnace and combustion takes place adjacent a plurality of circumferentially located tuyeres adjacent the top of the coke bed through which a moderate air blast is introduced. The resulting carbon dioxide is completely converted to carbon monoxide as it passes upwardly through the coal and the reducing atmosphere prevents the oxidation of the sulfur in the coal while the decomposed limestone combines with the sulfur to produce sulfur bearing compounds. These compounds, as well as the ash are removed by the slag so that a substantially clean combustion of the coal is achieved to provide a fuel gas which can in turn be cleanly combusted in a separate facility for the generation of power. A substantial transfer of heat from the furnace to the separate facility is accomplished by the nitrogen supplied by the air blast.

6 Claims, 3 Drawing Figures

COAL REACTOR

CROSS REFERENCE TO RELATED APPLICATION

This application is a continuation-in-part application of application Ser. No. 355,400, filed May 30, 1973, entitled, "Clean Energy Sources from Efficient Conversion of Coal and Related Fossil Fuels: etc. and now abandoned."

BACKGROUND OF THE INVENTION

Field of the Invention

The present invention is directed to the production of a fuel gas and more specifically to the production of the fuel gas by the clean combustion of coal in the presence of a slagging agent.

Prior Art

The typical blast furnace operation is well known and involves the introduction of predetermined proportions of coke, limestone and iron ore into a vertical shaft furnace having a ratio of height to diameter of at least 2:1. The operation of such a blast furnace requres the use of large volumes of relatively expensive metallurgical coke which has sufficient strength to support the extremely heavy load or burden in the furnace. The limestone provided a suitable flux for capturing the impurities from the coke and the iron ore, which flux would float on the pig iron derived from the iron ore. Periodically the slag would be drawn off through a side port and the pig iron would be drawn off through the bottom of the furnace. The resultant blast furnace gas had sufficient caloric value so as to be suitable for separate independent combustion to provide power for auxiliary operations attendant to a blast furnace. In the operation of the blast furnace a large volume of preheated air was required to form the air blast through the tuyeres to carry out the combustion of the coke.

At present, a large proportion of the electrical power generated in this country is achieved by the operation of steam powered turbines. The steam is usually generated in a boiler which is fueled by coal or oil and the present oil shortage has resulted in the conversion of a large number of previously oil fired boiler to coal operation.

However, due to strict environmental standards the utility companies are limited to the particular grade of coal which can be utilized in such a boiler. It is absolutely necessary to use a low sulfur coal since the ordinary combustion of the coal in an oxidizing environment would create the objectionable sulphurous oxides. In order to remove such sulphurous oxides it has been necessary to resort to very expensive scrubbing equipment to prevent the release of the oxides to the atmosphere. Even the best of the scrubbing devices still do not remove all of the objectionable oxides thereby necessitating the use of low sulfur coal. While large deposits of high sulfur coal are present in the eastern part of the United States it has become necessary to ship large volume of low sulfur coal from the western part of the United States to the eastern part. However, the low sulfur western coal has a very low caloric value relative to eastern coal thereby necessitating the use of substantially larger amounts of western coal to fuel eastern utilities than would be necessary if the sulfurous eastern coal could be used.

SUMMARY OF THE INVENTION

The present invention provides a coal reactor which accomplishes the clean combustion of coal, even high sulfur content coals, to provide a high caloric fuel gas in truncated vertical shaft furnace having a diameter substantially equal to the height of the furnace.

The present invention provides a coal reactor for the clean combustion of coal in the presence of a slagging agent such as limestone so that the resultant ash and sulfur bearing compounds will be removed in the slag.

The present invention provides a coal reactor for the clean combustion of coal in the presence of a slagging agent such as limestone in a vertical shaft furnace which utilizes a moderate unheated air blast supplied directly to the combustion zone through a plurality of circumferentially located water-cooled tuyeres.

The present invention provides for the production of a high caloric fuel gas by the clean combustion of coal in a reducing atmosphere with the resultant ash and sulfur bearing compounds being captured by a slagging agent. A large amount of heat is also transferred from the furnace by the nitrogen present in the gas.

The foregoing and other objects, features and advantages of the invention will be apparent from the following more particular description of preferred embodiments of the invention as illustrated in the accompanying drawings.

DETAILED DESCRIPTION OF THE INVENTION

Figure 1:
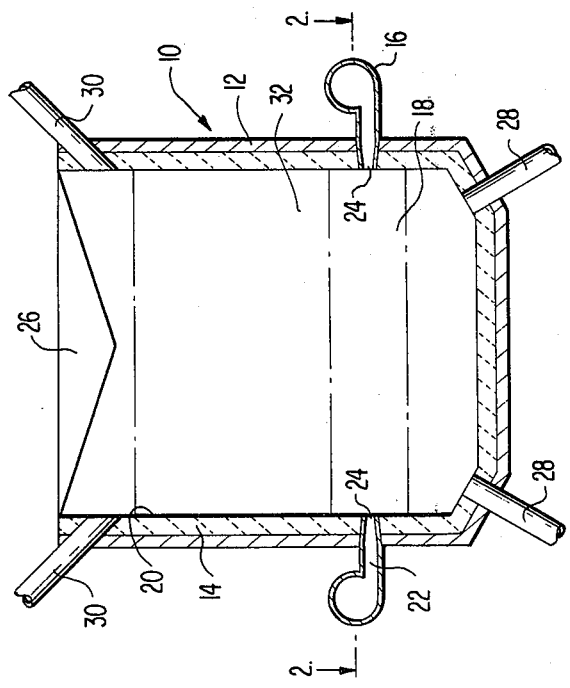
FIG. 1 is a schematic vertical sectional view of the vertical shaft furnace according to the present invention.

The coal reactor 10 which is shown schematically in FIG. 1 is basically a vertical shaft furnace having an outer shell 12 of steel and an inner lining 14 of fire brick or other suitable refractory material. The manner which the coal reactor is lined is similar to the lining for the standard blast furnace for producing iron. As in the conventional blast furnace the present coal reactor is also provided with a circumferentially extending bustle pipe 16 for providing a moderate unheated air blast to the combustion zone within the interior 20 of the reactor. A plurality of individual pipes 22 are directed radially inwardly from the bustle pipe 16 to the tuyeres 24 which are equally spaced about the circumference of the reactor.

Contrary to the conventional blast furnace which has a height in excess of twice the diameter of the furnace the coal reactor according to the present invention has a height approximately equal to the diameter and has a substantially cylindrical internal configuration as opposed to the conventional blast furnace which exhibits a distinctive bulge in the combustion zone. A conventional bell arrangement 26 similar to that used in conventional blast furnaces is provided for the introduction of the raw material into the coal reactor. One or more slag withdrawal pipes 28 are provided at the bottom of the reactor for withdrawing the slag which is formed within the reactor during the combustion of the coal in the presence of a slagging material such as limestone. One or more gas effluent pipes 30 are provided adjacent the top of the coal reactor for removing the gaseous combustion products.

Figure 2:
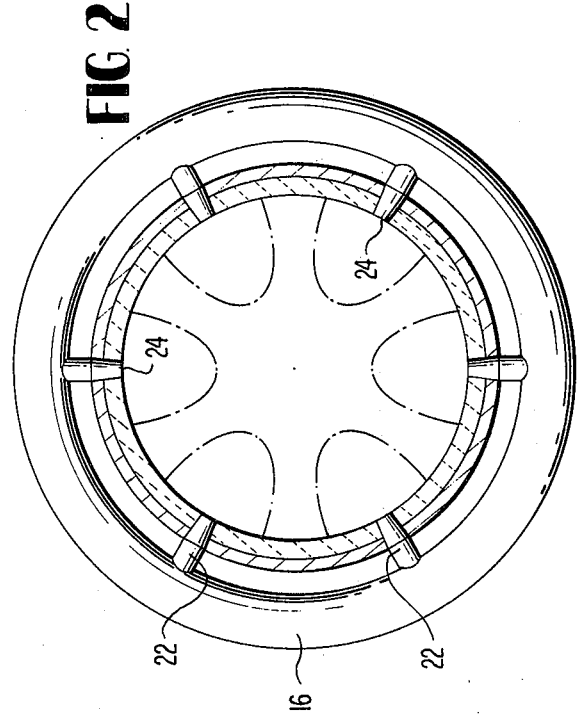
FIG. 2 is a schematic sectional view taken substantial on line 2—2 of FIG. 1.

In a conventional blast furnace for the production of pig iron having a capacity of approximately 4,000 tons per day there are approximately 42 tuyeres located in equally spaced manner about the circumference of the furnace for the introduction of the hot air blast. The number of tuyeres 24 which are utilized in the present coal reactor would be comparable for a coal reactor having a diameter of equal size. In any event, the tuyeres 24 would be equally spaced about the circumference of the coal reactor as shown in FIG. 2 wherein 6 tuyeres have been illustrated schematically solely as an example.

This start up of the coal reactor 10 is similar to that for a conventional blast furnace wherein a supply of coke is first ignited in the chamber 20. Thereafter, a suitable mix of coke and limestone having an approximate ratio of 9:1 depending upon the coke analysis is gradually added to build up a coke bed above the tuyere level. The limestone will provide a slagging action to capture the sulfur bearing compounds and the ash to prevent air pollution. Once the top of the bed is above the tuyeres a moderate blast of air is supplied through the tuyeres 24 but the blast of air need not be heated as in the blast furnace and can be introduced at ambient temperatures. The coal reactor is operated solely with coke and limestone until an even rate of combustion is achieved. During this time, assuming a reactor having a total depth of approximately 10 feet and a diameter approximately equal to the height, it would be necessary to add approximately 1 ton of coke and limestone per day with the production of approximately 200 pounds of slag. When a steady state is reached, that is when the effluent gas is approximately 65% nitrogen and 35% CO, coal is substituted for the coke in the feed stock until such time as a bed of coke remains below the level of the tuyeres and a mix of coal and limestone is provided above the tuyeres 24. The coke bed is maintained since it is located in a "dead" space not effected by the air blast. The bed of coke is replenished in the combustion zone since a sufficient percentage of the coal in the burden is charred as it passed downwardly to form coke.

In the combustion zone 18 a plurality of cavities will be formed in the coke bed as a result of the air blast from the tuyeres 24 and the coal and limestone mix is gradually fed downwardly by gravity into the pockets wherein the complete combustion of the coal will take place. The bed of coal above the tuyeres is of sufficient depth so that the carbon dioxide which is produced by the combustion of the coal will be completely converted to carbon monoxide by the time it reaches the space above the bed of coal and limestone. This can readily be determined by an analysis of the effluent gases. The limestone is decomposed and melted to form a flux which will not only capture the ashes from the coal but also the sulfur bearing compounds resulting from the combustion of the coal. Thus, it is possible to use a coal having a very high sulfur content since the coal is combusted in a reducing atmosphere to prevent the formation of the objectionable sulphurous oxides. The slag which is formed as a result of the combustion of the coal in the presence of the limestone can be periodically drained off through at least one slag outlet 28 disposed adjacent the bottom of the coal reactor.

The temperature of the coal reactor in the combustion zone 18 will be in the range of 1200° C. to 1500° C. with the preferable operating temperature being approximately 1300° C. The conventional blast furnace for the production of pig iron generally maintains the combustion zone at approximately 1500° C. but it is possible to operate the coal reactor according to the present invention at the reduced temperature of 1300° C. since there is no iron ore present. The large volume of nitrogen in the air blast acts as a coolant to lower the temperature. As a result of the lower operating temperatures in the combustion zone 18 the life of the refractory lining will be considerably extended. The reduced surface to volume ratio of the charge or burden also reduces wall contact to extend the life of the refractory lining. Approximately midway between the top and bottom of the coal and limestone layer 32 above the combustion zone 18 the temperature is approximately 1000° C. and the temperature gradually and uniformly is reduced from this point to the top of the layer 18 where the temperature is approximately 300° C. These temperatures which define the vertical gradient are the average temperatures at each level. As indicated previously the carbon dioxide which is generated by the combustion of the coal in the combustion zone 18 passes upwardly through the layer of coal and limestone 32 along with the nitrogen and the carbon dioxide is converted into carbon monoxide thereby maintaining a reducing atmosphere in the coal and limestone layer. The limestone, calcium magnesium carbonate ($CaMg(CO_3)_2$) or calcium carbonate ($CaCO_3$) is decomposed and melted into CaO and carbon dioxide. This takes place approximately between the 600° C. level and 1000° C. level. The calcium oxide combines with the sulfur (pryritic and organic) in the coal to form compounds of sulfur, such as calcium sulfide which are removed with the slag. The carbon dioxide is partially converted to carbon monoxide but some $CO_2$ escapes. A small amount of $H_2O$ from coal is converted to water gas so that a small amount of hydrogen will also appear in the gaseous effluent. Other impurities in the coal and limestone might cause trace amounts of other elements in the gas. The gas is therefore comprised substantially of approximately 60–65% nitrogen and 30–35% carbon monoxide with trace amounts of the carbon dioxide $H_2$, water vapor. The gas can be passed through a scrubber or a cyclone 60 to remove any dust from the gas but due to the fact that the sulphurous oxides have been substantially or completely eliminated and since the coal ash is taken off with the slag the need for expensive air cleaning equipment has been obviated.

With respect to the energetics of the combustion process it is well known that:

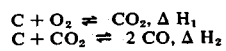

$$C + O_2 \rightleftharpoons CO_2, \Delta H_1$$
$$C + CO_2 \rightleftharpoons 2\ CO, \Delta H_2$$

Considering the relative energy released as heat in the furnace as compared to the amount temporarily stored in the gaseous effluent that can be burned when it is desired to yield more energy the latter is accomplished according to the following reaction:

$$2\ CO + O_2 \rightleftharpoons 2\ CO_2, \Delta H_3$$

Noting that the thermal energy developed in the furnace is related to the partial combustion:

$$2C + O_2 \rightleftharpoons 2CO, \Delta H_4$$

which actually constitutes the resultant sum of the first two equations, then per mole of carbon it follows that:

$$\frac{1/2 \Delta H_4}{\Delta H_1} = \% \text{ energy delivered to the furnace}$$

$$\frac{1/2 \Delta H_3}{\Delta H_1} = \% \text{ energy stored molecularly}$$

employing the molar enthalpies:

$$\left. \begin{array}{l} 1/2\,\Delta H_4 = -26 \text{ Kcal} \\ \Delta H_1 = -94 \text{ Kcal} \\ 1/2\,\Delta H_3 = -68 \text{ Kcal} \end{array} \right\} \Delta H_1 = 1/2\,(\Delta H_3 + \Delta H_4)$$

The value for the percentage of energy delivered to the furnace will be 28% and the value for the energy stored molecularly will be 72%.

Nearly three times as much energy is stored in the gaseous effluent than is released thermally in the furnace itself. Thus, the bulk of the energy for power production derives from the gaseous fuel whereas the remainder is distributed over the various processes that represent the fate of the furnace thermal energy. Furthermore, the nitrogen component of the blast being delivered through the tuyeres 24 will assume the role of a coolant to transfer the heat which can be used to generate power in the external environment.

Figure 3:
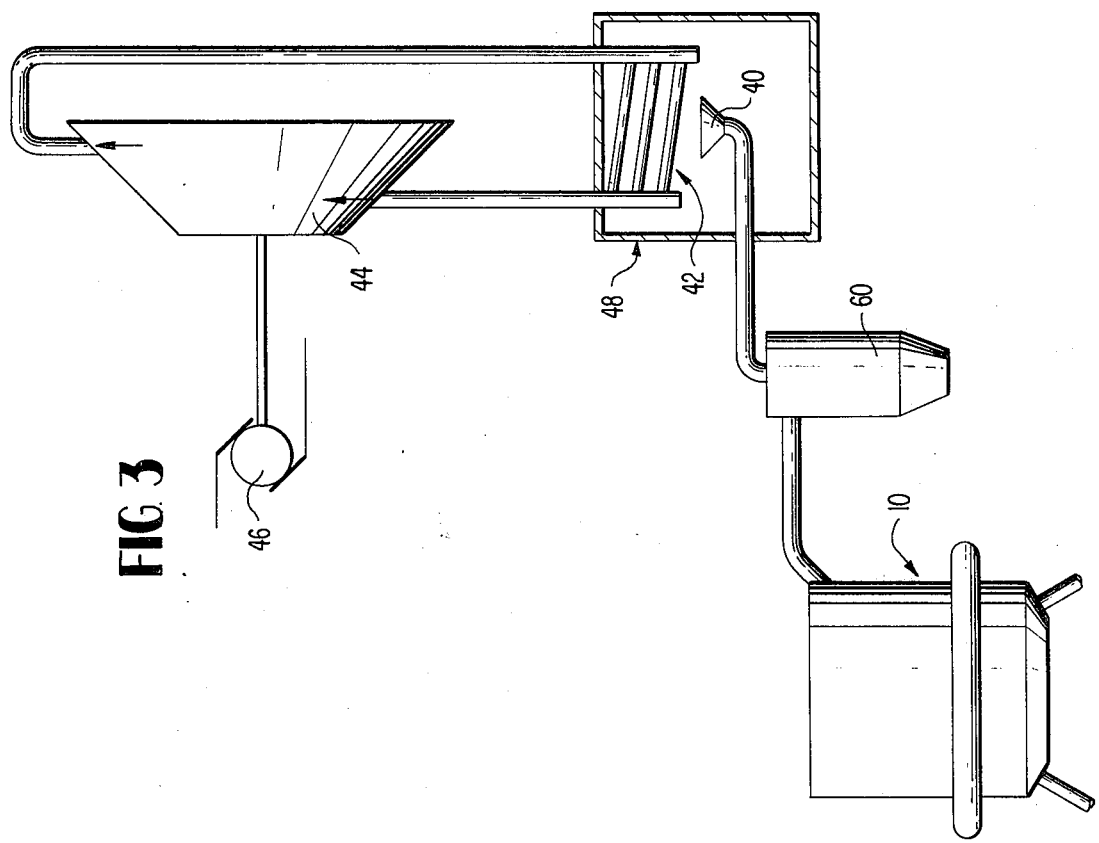
FIG. 3 is a schematic flow diagram showing the power generating system utilizing a coal reactor according to the present invention.

Sucn an arrangement is shown schematically in FIG. 3 wherein the gases derived from the coal reactor 10 are cleaned at 60 and supplied to a burner 40 where they are combusted to heat the water passing through the coil arrangement generally designated at 42 for converting the water to steam. The steam can then be used directly to drive a turbine 44 which in turn will drive a suitable electric generator 46. The boiler arrangement 48, the turbine 44 and the electric generator 46 are all of well known conventional structure and since the details of these elements do not form a part of the present invention is not deemed necessary to illustrate the same in greater detail.

Thus, coal is burned in a closed system without the generation of obnoxious sulfurous oxides or flyash so prevalent in present day boilers which generate steam for electric power production. The size of the coal reactor may vary considerably while maintaining the same ratio of diameter to height.

While the invention has been particularly shown and described with reference to a preferred embodiment thereof, it is to be understood by those in the art that various changes in form and details may be made therein without departing from the spirit and scope of the invention.

What is claimed is:

1. A method for the clean combustion of sulfur bearing coal comprising, introducing a mixture consisting essentially of said coal and limestone into a substantially closed vertical shaft furnace, burning said coal in the presence of the limestone, decomposing and melting the limestone to provide a slagging action for removal of ash and sulfur bearing compounds resulting from said burning, introducing an unheated air blast into the furnace through a plurality of circumferentially spaced tuyeres to define a combustion zone within the furnace adjacent the level of the tuyeres, converting a carbon dioxide produced by the burning of the coal in the combustion zone to carbon monoxide as it passes upwardly through the coal and limestone burden, removing the slag from the bottom of the furnace and removing the gaseous effluent from the top of the furnace which is comprised substantially of nitrogen and carbon monoxide.

2. A method as set forth in claim 1 wherein the temperature of the combustion zone is maintained between 1200° C. and 1500° C.

3. A method as set forth in claim 2 wherein the temperature of the combustion zone is maintained at approximately 1300° C.

4. A method for the clean combustion of sulfur bearing coal comprising burning coal in the presence of limestone in a substantially closed system consisting essentially of said coal and said limestone and having a reducing atmosphere thereby preventing the formation of sulfurous oxides and producing a fuel gas.

5. A coal reactor for the clean combustion of sulfur bearing coal in the presence of limestone comprising a truncated vertical shaft furnace having an internal combustion chamber with a diameter substantially equal to the height, means for introducing coal and limestone at the top of said furnace, a ring of circumferentially spaced tuyeres extending through the vertical wall of the furnace and spaced above the bottom, means for introducing an ambient temperature air blast, means for removing the sulfur bearing slag from the bottom of sid furnace and means for removing the gaseous effluent resulting from said combustion.

6. A coal reactor as set forth in claim 5 further comprising means for burning said gaseous effluent to provide additional heat to convert water to steam and means for utilizing said steam to drive an electric generator.

* * * * *